United States Patent
Levin et al.

(10) Patent No.: US 7,370,208 B2
(45) Date of Patent: May 6, 2008

(54) METHOD AND APPARATUS FOR AUTOMATIC CONTROL OF ACCESS

(75) Inventors: Shmuel Levin, 17 Arlozorov Street, 75210 Rishon LeZion (IL); Shai Ashkenazi, Rechovot (IL)

(73) Assignee: Shmuel Levin, Rishon Le Zion (IL)

(*) Notice: Subject to any disclaimer, the term of this patent is extended or adjusted under 35 U.S.C. 154(b) by 561 days.

(21) Appl. No.: 10/469,229

(22) PCT Filed: Mar. 7, 2002

(86) PCT No.: PCT/IL02/00184

§ 371 (c)(1), (2), (4) Date: Sep. 5, 2003

(87) PCT Pub. No.: WO02/071765

PCT Pub. Date: Sep. 12, 2002

(65) Prior Publication Data

US 2004/0088553 A1    May 6, 2004

(51) Int. Cl.
*H04K 1/00*    (2006.01)
(52) U.S. Cl. .................... 713/182; 713/186
(58) Field of Classification Search .......... 713/182, 713/186
See application file for complete search history.

(56) References Cited

U.S. PATENT DOCUMENTS

| | | | |
|---|---|---|---|
| 5,774,525 A * | 6/1998 | Kanevsky et al. | 379/88.02 |
| 6,092,192 A * | 7/2000 | Kanevsky et al. | 713/186 |
| 6,411,933 B1 | 6/2002 | Maes et al. | |
| 6,417,797 B1 * | 7/2002 | Cousins et al. | 342/179 |
| 6,421,453 B1 * | 7/2002 | Kanevsky et al. | 382/115 |
| 6,483,929 B1 * | 11/2002 | Murakami et al. | 382/115 |
| 6,496,936 B1 | 12/2002 | French et al. | |
| 7,133,792 B2 * | 11/2006 | Murakami et al. | 702/104 |
| 2003/0065264 A1 | 4/2003 | Tsoref et al. | |

* cited by examiner

*Primary Examiner*—Kambiz Zand
*Assistant Examiner*—Mohammad W. Reza
(74) *Attorney, Agent, or Firm*—Ra tnerPrestia

(57) ABSTRACT

A method and apparatus for controlling access of individuals to a service, device or location in order to restrict access to members of a particular age and/or gender category, by machine-sensing a predetermined biometric characteristic of the individual indicative of the particular age and/or gender category, and utilizing the machine-sensed characteristic for automatically controlling access of the individual. The method and apparatus are particularly suited to controlling access of children to certain Internet sites, TV programs, chat rooms, or other places inappropriate to children.

21 Claims, 9 Drawing Sheets

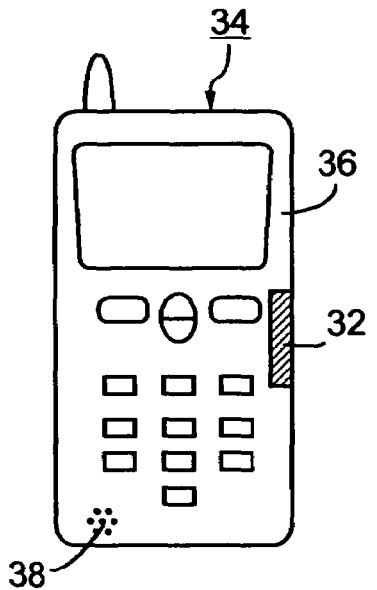
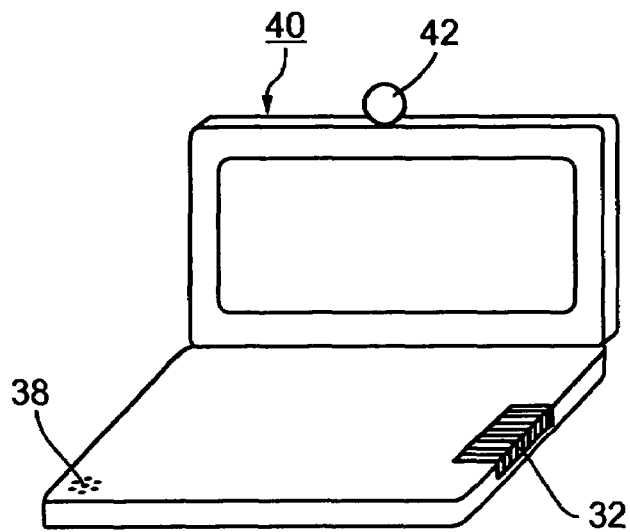
Fig. 2c        Fig. 2d
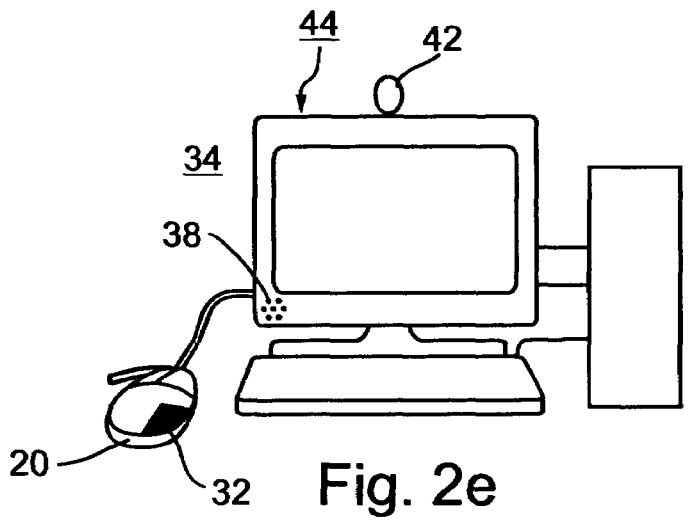
Fig. 2e
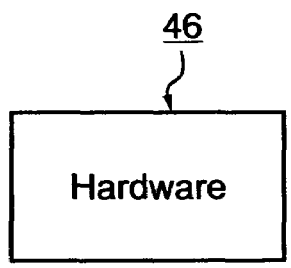
Fig. 3
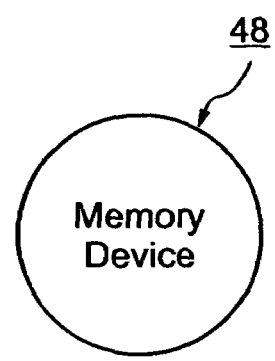
Fig. 4

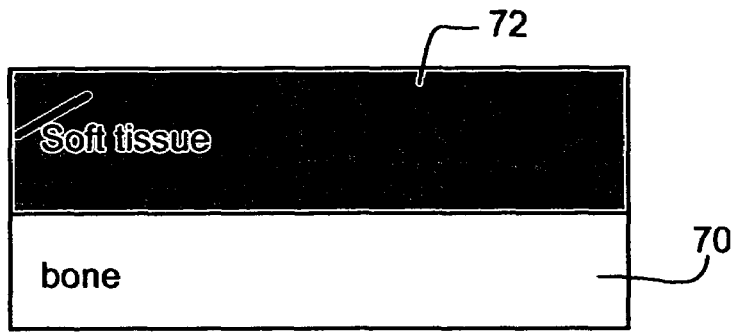
Fig. 10 (Conf. A)
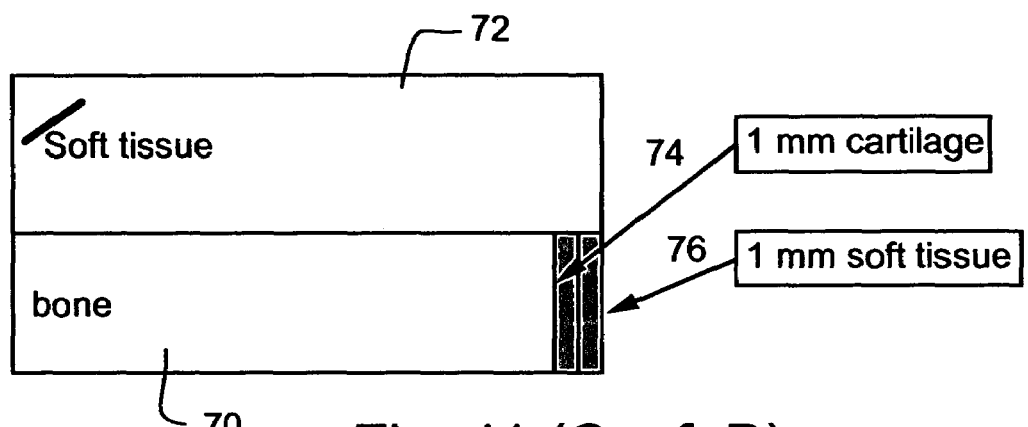
Fig. 11 (Conf. B)
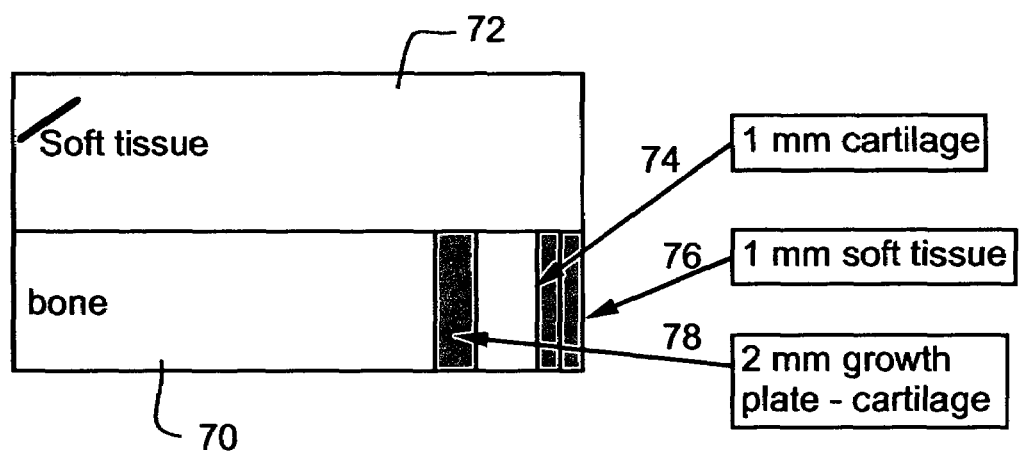
Fig. 12 (Conf. C)

METHOD AND APPARATUS FOR AUTOMATIC CONTROL OF ACCESS

FIELD OF THE INVENTION

The present invention relates to a method, apparatus and commercial service for automatically controlling access of an individual to a service, device or location. The method and apparatus are particularly suitable for controlling access by children to age-inappropriate Internet sites or TV programs, and is therefore described below primarily with respect to these applications.

BACKGROUND OF THE INVENTION

With the increasing popularity of the Internet, the question as to what extent access to information can and should be controlled has become more complicated than ever before. On the one hand, freedom of expression is a necessity of any liberal, democratic society. On the other hand, cyberspace has made it possible for various undesirable groups to project their messages and to target victims without fear of consequence. While critics of Internet regulation often fear unwanted government intrusion into the lives of civilians, few groups dispute that material like pornography or depictions of dehumanizing violence warrant some safeguards.

No group is more at risk from exposure to harmful material via the Internet than children. The combination of the natural curiosity of children, with the almost endless quantity of information in cyberspace, guarantees that some children will, either intentionally or unintentionally, encounter materials that they should not be seeing at a young age.

While children under the age of sixteen currently account for almost 50 percent of the on-line population in the United States, the vast majority of their activities on-line are unsupervised. The nature of the Internet allows a child a fully interactive experience from the "privacy" of home. In addition, at present, many children are more knowledgeable about the Internet than their parents.

Obviously, parental preferences regarding the control of their children's Internet activity varies among parents. Most people agree that regulation of child Internet activity is a right and responsibility of parents in the same way that parents are charged with raising their children in line with their own personal moral and ethical values, as well as those of the society at large.

Children are more vulnerable and less able to apply critical judgment than adults. Therefore parental supervision of some sort has become paramount, but the advent of the Internet poses a great difficulty to such supervision.

Currently there are several methods of parental control for the Internet. The one most well-known and widely used is a blocking system that relies on Ratings or Labels; in which Internet Service Providers (ISPs) offer an option to prevent underage users from accessing sites of a certain rating. In addition, filtering software systems have also been developed for this purpose.

However, such blocking and filtering systems are not user-friendly, and they are far from being fool-proof. In order to employ blocking, parents must set up separate accounts through the ISP with separate passwords. This creates the difficulties of remembering passwords while hiding them from children. In addition, net-savvy children can figure out ways to gain access to the passwords, or bypass them altogether. Additionally, password systems also suffer from problems of being stolen, forgotten, shared, or intercepted by hackers.

There are many instances where control of access is desirable when carefully balanced between the freedom to be engaged in various activities, and other values beneficial to the individual and/or society, such as safety, privacy, negative influence, education and the freedom to congregate. For example, it is well accepted that adult Internet sites that display pornography should be age-restricted, i.e., forbidden for children to access. Some Internet sites serving the homosexual or lesbian communities may wish to be gender restricted so as to allow only male or female access. Access to public rest-rooms should be gender restricted. Access of children to alcoholic beverage selling businesses, restricted cinema movies, and shows, vending machines offering cigarettes and/or liqueur etc., should be forbidden or controlled. Similarly, access of children to various danger imposing household electronic or electrical devices, such as a stove, should be restricted.

There is thus a widely recognized need for, and it would be highly advantageous to have, a method and apparatus for automatically controlling access of an individual to a service, device or location, based on the classification of the individual with respect to a particular category, such as an age and/or gender-category.

Biometric systems are known which identify users using fingerprints, palm prints, retinal identification, face recognition, voice recognition and the like. Such prior art biometric systems, however, generally base the access on a determination of whether the user is identified as a particular individual, rather than as a member of a particular category of individuals. Such prior art systems thus require that each user must have been previously identified, and that the user's identity must have been stored in a data base to be searched when the access is sought. In addition the individual may, over the course of time, change classification category (e.g., grow older so as to be in a different age category), such that a previous recorded identity of an individual would not necessarily indicate the present category of the individual.

SUMMARY OF THE INVENTION

According to one aspect of the invention there is provided a method of controlling access of an individual to a service, device or location in order to restrict access to members of a particular category, comprising: machine-sensing a predetermined biometric characteristic of the individual indicative of the particular category; and utilizing the machine-sensed characteristic for automatically controlling access to the service, device or location.

According to preferred embodiments of the invention described below, the particular category is an age category, and/or a gender category. That is, access is controlled to a service, device or location, based on determining whether the individual is a child or adult, and/or a male or female.

In a preferred embodiment of the invention, the child or adult status is determined by the degree of bone ossification of the individual by sensing the presence, absence and/or thickness of a growth-plate in an examined bone. Suitable software or hardware based logic analyzes the sensed presence, absence or thickness of a bone growth-plate and compares same to a database correlating the presence, absence or thickness of the bone growth-plate to whether the individual is a child or an adult. After the individual is determined to be a child or an adult, an appropriate signal is outputted permitting or denying access.

By using appropriate sensors, such as ultrasonic sensors, microphones, cameras, respirators, skin attached sensors and the like, other biometric parameters, such as voice, facial patterns, respiration volume, skin thickness, biochemical features (e.g., blood biochemistry), and the like, can be sensed and used to classify an individual into an age and/or gender and/or other classification group.

According to still further features in the described preferred embodiment, access is automatically controlled to an electronic medium such as specific Internet servers. Access, based on whether the individual is a child or adult, is preferably determined by sensing the presence, absence or thickness of a growth-plate in an examined bone of the individual. According to described preferred embodiments, the examined bone is a finger phalange or wrist of the individual and is preferably sensed using ultrasound technology. The ultrasound device or other sensor is preferably housed in a manual control member, such as a computer input device, (e.g., a computer mouse, keyboard, TV or Web TV remote control and the like), or in an electronic or electrical device such as, but not limited to, a computer, a telephone, a cellular telephone or a personal digital assistant, especially of the type having Internet browsing capabilities, a food processor and the like.

In another aspect of the invention, there is provided an apparatus for controlling access to a service, device or location in order to restrict access to members of a particular category, comprising: at least one sensor for sensing a predetermined biometric characteristic of the individual indicative of the particular age and/or gender category; and a data processor for receiving and analyzing the sensed biometric characteristic; comparing the biometric characteristic to a reference data that correlates the biometric characteristic to the particular category; and outputting a signal indicating whether or not access to the particular service, device or location is permitted. As indicated earlies, the particular category is preferably an age category (e.g., adult/child) and/or a gender category (e.g., male, female).

In another aspect of the invention, there is provided a memory device storing in an installable format a software application for analyzing at least one biometric characteristic of an individual to determine if the individual belongs to a particular category, such as an age or gender category, and for automatically controlling access of the individual to a service, device or location in order to restrict access according to the particular category.

In yet another aspect of the invention, there is provided a hardware, such as a computer or server (e.g., Internet server, ISP server, for example), storing in an executable format an application for analyzing at least one biometric characteristic of an individual to determine if the individual belongs to a particular category; and for automatically controlling access of the individual to a service, device or location in order to restrict access according to the particular category.

In a still further aspect of the invention, there is provided a method of conducting business comprising upgrading a user client to perform a biometric age and/or gender classification, and selling or licensing to the service provider and/or content provider an access control package operable with the user client.

As will be described more particularly below, the present invention enables access control to be effected in a manner which is easy enough to be understood by parents, who may have little or no experience with the Internet, and which does not allow bypass by children who are often far more experienced in using the Internet than their parents. It can be implemented in an automatic system not requiring special accounts with an Internet Service Provider. Therefore, parents need not remember nor hide passwords, and, children can not hack into the system.

The invention also does not require passwords, passcards, or the like, so there is nothing to lose, misplace, have stolen, or share. The invention uses category data as a reference database and therefore does not need to pre-identify individuals nor to possibly invade the private of a particular individual when seeking access. Also, the biometric characteristics, used are those that are characteristic of a broad category of individuals and therefore do not change with changes in the individuals.

Furthermore, the use of a biometric characteristic that can differentiate between children and adults and between genders, as in the preferred embodiments of the invention, is particularly suited for automatically controlling access to certain Internet sites or TV programs by children without restricting access by adults.

Further features, advantages and applications of the present invention will be described and become apparent in the description below.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 2a-2e illustrate several forms of apparatuses for automatically controlling access in accordance with the present invention;

FIG. 3 is a schematic presentation of a hardware such as a server (e.g., Internet server, ISP server, for example) according to the present invention;

FIG. 4 is a schematic presentation of a memory device according to the present invention;

FIGS. 10-12 are schematic presentations of simulations of a bone helpful in understanding the manner of distinguishing age categories by examining a bone of an individual, FIG. 10 being a simulation of a bone without a joint; FIG. 11 being a simulation of a bone with a joint at the end; and FIG. 12 being a simulation of a bone with a growth-plate and a joint at the end;

BRIEF DESCRIPTION OF THE PREFERRED EMBODIMENTS

Figure 1:
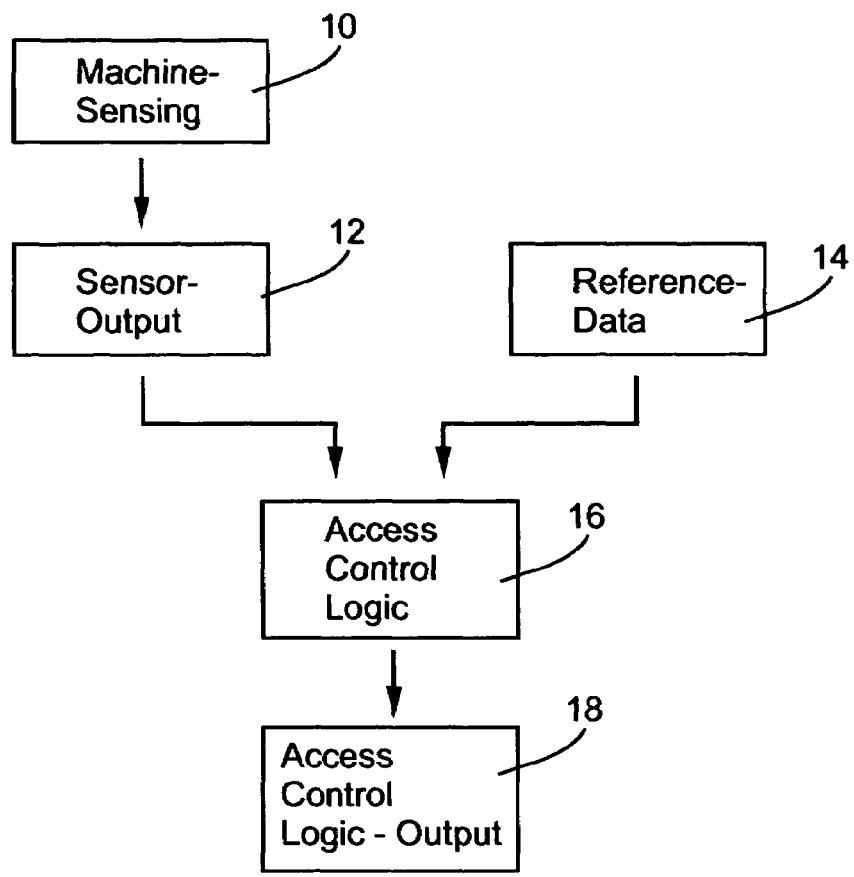
FIG. 1 is a general flowchart of a method of controlling access in accordance with the teachings of the present invention.

The preferrred embodiments of the present invention as described below relate to a method and apparatus which can be used for automatically controlling access of an individual to a service, device or location. Specifically, the present invention can be used to restrict access of an individual to an age and/or gender inappropriate Internet sites, TV programs, devices and/or locations, so as to provide appropriate checks and balances between the freedom to be engaged in various activities characteristic of a free society, and the need to safeguard other values beneficial to society such as safety, inapropriate exposure to undesired influence, privacy, freedom of expression, education, and the freedom to congregate.

The present invention can thus be used, for example, for restricting access of children to adult Internet sites that display pornography, violence and the like; for restricting access of children to alcoholic beverage selling businesses, restricted cinema movies, restricted shows, etc.; for restricting access to rest-rooms according to gender; and for restricting access of children to various dangerous household electronic or electric devices.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

With reference now to the drawings, FIG. 1 illustrates a broad flowchart demonstrating a basic concept involved in the present invention.

Thus, in one aspect thereof, the present invention provides a method of controlling access of an individual to a service, device or location, in order to restrict access to members of a particular category, such as an age and/or a gender category. For this purpose, a predetermined biometric characteristic of the individual, indicative of a particular category to which the individual is classified, is machine-sensed, as indicated by block 10 in FIG. 1. Such machine-sensed characteristic is then used for automatically controlling access of the individual to a particular service, device or location. To this end, a sensor output (block 12) and, reference data (block 14) are fed (per block 16) into an access control logic (e.g., software, hardware/firmware or a combination of both), which, produces an access control logic output (block 18), e.g., permission or denial of access.

The presently preferred embodiments of the invention, as described below relate to a method and apparatus for automatically controlling access to the Internet, or to particular Internet sites, based on an age category (whether the individual user is a child or an adult) and/or based on a gender category (whether this individual is a male or female).

FIGS. 2a-2e show several apparatuses which either presently include or are modified or adapted to include, in accordance with the teachings of the present invention, a sensor which can be used to sense a biometric characteristic of an individual indicative of a particular category, such as age or gender.

Figure 2A:
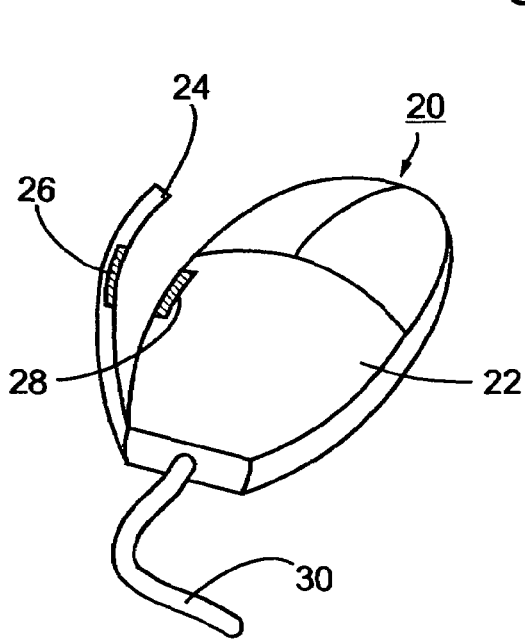

FIG. 2a illustrates a computer input device 20 (namely a mouse) including a manually graspable base 22 having an appendage 24 spaced from the base for receiving a user's finger or thumb. Base 22 and appendage 24 house the components of an ultrasound bone growth-plate measurement sensor. Such a sensor includes an ultrasound transmitter 26 carried by appendage 24, and receiver 28 carried by base 22 for examining a bone of the user, namely that in a finger or thumb placed between appendage 24 and base 22. According to another embodiment on the invention, described below, transmitter 26 and receiver 28 may be a light source and a light detector, respectively.

FIG. 2a shows transmitter 26 housed in appendage 24 and receiver 28 housed in base 22; however the locations can be reversed. A cable 30 energizes ultrasound transmitter 26 and recevier 28 and outputs the data from the receiver to a sensor output unit (not shown) for processing as will be described below.

Figure 2B:
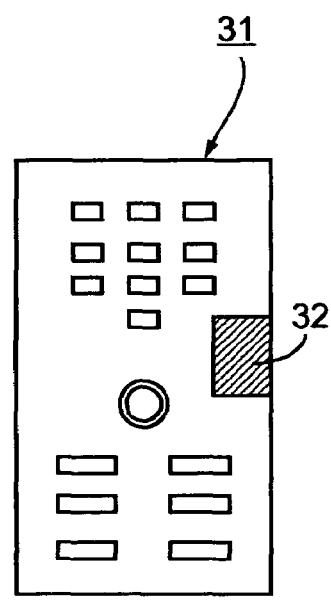

FIG. 2b illustrates a remote control 31 e.g., for a TV receiver, having an ultrasound transceiver 32 which transmits ultrasound signals and receives back-reflected ultrasound signals. Unit 31 thus functions similarly to computer input device 20, FIG. 1, but obviates the need for the appendage 24, since both the transmitter and receiver are within the transceiver unit 32 of FIG. 2b.

FIGS. 2c-2e show various other electronic/electrical devices having one or more biometric sensors which are either normally present or added thereto. Thus, FIG. 2c shows a cellular telephone 34 including a housing 36 having a microphone 38 which is normally present in cellular telephones, and an ultrasound transceiver 32 which is not normally present in a cellular telephone. FIG. 2d shows a telephone or personal digital assistant 40 allowing Internet/TV access and including a microphone 38 and a camera 42 which may be normally present in such devices, and an ultrasound transceiver 32 which is added thereto. FIG. 2e shows a computer system 44 allowing Internet/TV access and including a mouse 20, a microphone 38, and camera 42, which may be normally present in the computer systems. In this case, the mouse 20 is provided with an ultrasound transceiver 32, rather than a separate transmitter and receiver as in FIG. 2a.

As shown in FIG. 1, access control logic 16 receives the sensor output (e.g., from receiver 28, FIG. 2a, or transceiver 32, FIGS. 2b-2e), compares it to reference data, determines from this comparison the age and/or gender category of the user, and sends an access signal, which can be access permission or access-denial. It will be appreciated that the access control logic can be housed (e.g., stored in an executable format) and/or executed from the respective input device shown (e.g., in FIGS. 2a-2c), and/or similar devices, or from a device with which these devices communicate, such as various computers and/or servers, including, but not limited to, Internet servers including ISP servers, content provider servers, filtering servers, servers of TV/Cable/Satellite broadcasters, telephony servers, cellular provider servers, etc.

FIG. 3 schematically illustrates the hardware 46 while FIG. 4 schematically illustrates the software 48. These can be, for example, a server, a computer (e.g., a user client) or a logic chip (firmware) for storing in an executable format an application for analyzing at least one biometric characteristic of an individual to determine if the individual belongs to a particular category, and for automatically controlling access of the individual to a service, device or location in order to restrict access according to the particular category.

The terms "user client" and/or "server", also referred to herein invariably as "computational devices", include, but are not limited to, personal computers (PC) having an operating system such as DOS, Windows™, OS/2™ or Linux; Macintosh™ computers; computers having JAVA™-OS as the operating system; graphical workstations such as the computers of Sun Microsystems™ and Silicon Graphics™, and other computers having some version of the UNIX operating system such as AIX™ or SOLARIS™ of Sun Microsystems™; or any other known and available operating system, or any device, including but not limited to: laptops, hand-held computers, PDA (personal data assistant) devices, cellular telephones, any type of WAP (wireless application protocol) enabled devices, wearable computers of any sort, which can be connected to a network and which has an operating system. Hereinafter, the term "Windows™" includes but is not limited to Windows95™, Windows 3.x™ in which "x" is an integer such as "1", Windows NT™, Windows98™, Windows CE™, Windows2000™, and any upgraded versions of these operating systems by Microsoft Corp. (USA).

For the present invention, a software application could be written in substantially any suitable programming language, which could easily be selected by one of ordinary skill in the art. Obviously, the programming language chosen should be compatible with the computational device with which the software application is executed. Examples of suitable programming languages include, but are not limited to, C, C++, Perl, VisualBasic and Java.

In addition, the present invention could be implemented as software, firmware or hardware, or as a combination thereof. For any of these implementations, the functional steps performed by the method could be described as a plurality of instructions performed by a data processor.

The application is installed into hardware 46 (FIG. 3) from a memory device 48 (FIG. 4) which stores in an installable format a software application for analyzing at least one biometric characteristic of an individual to determine if said individual belongs to a particular category, and for automatically controlling access of the individual to a service, device or location, in order to restrict access according to the particular category.

Memory device 48 can be, for example, a RAM, a ROM, a CD, a DVD or a hard drive of any type of a nearby or remote computational device, from which application data can be installed or alternatively downloaded and thereafter installed.

Figure 5:
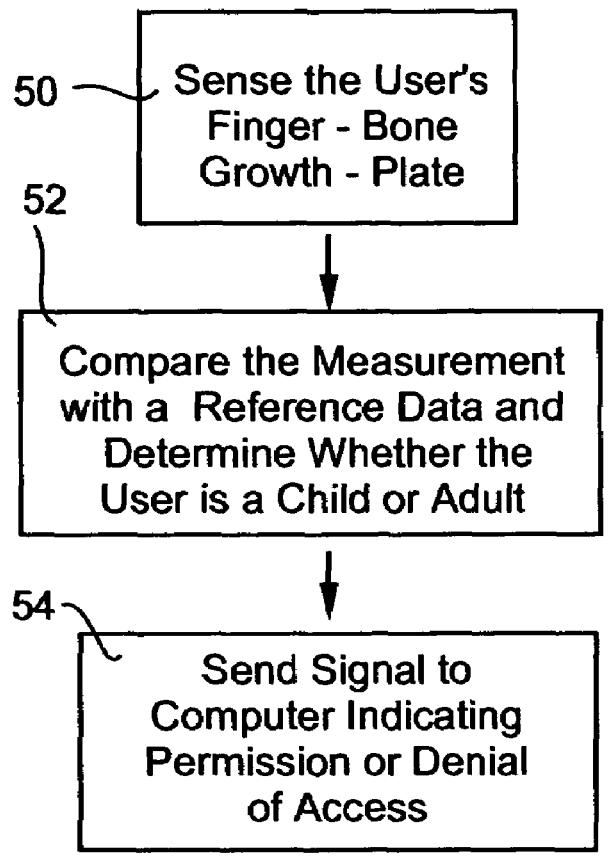
FIG. 5 is a flowchart of one example of a method in accordance with the teachings of the present invention.

FIG. 5 is a flowchart illustrating the method of the present invention when using a biometric sensor for examining the user's finger bone to determine whether the user belonogs to a particular age category.

First, as indicated by block 50, the presence, absence or thickness of a bone growth-plate in a finger phalanx of the user is sensed and/or measured. The, measurement output, as indicated by block 52, is then compared to a reference data correlating the presence, absence or measure of a bone growth-plate to child or adult status; and, based on the comparison, the individual is determined to be a child or adult. This determination results in the outputting of a signal indicating permission or denial of access (block 54). The requested access may be for example, to a particular Internet site, a particular telephone number, a particular TV/Cable show, a particular electronic or electrical device, or a particular location.

Further explanation of the preferred embodiment of the present invention will be better understood by the following background information on bone growth, cartilage, and puberty.

Figure 6:
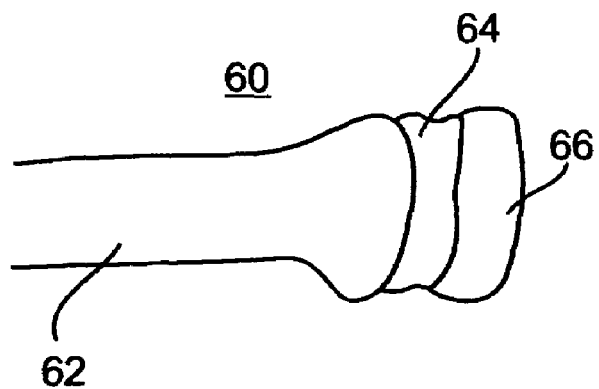
FIG. 6 is a schematic presentation of a bone in the growth stage.

FIG. 6 is a schematic presentation of one end of a bone 60 in its growth stage. Elongation of the bone shaft (also known as the diaphysis) 62 is what makes the bone to grow. After an individual's birth, a thin plate of cartilage (known as Epiphyseal Cartilage, Epiphyseal Plate or bone growth-plate), which is referred to herein as growth-plate 64, remains at the distal ends of growing bones. This growth-plate only becomes bone (ossifies) when the bone associated with it has completed its growth. The growth-plate 64 connects the head (epiphysis) 66 of bone 60 to the bone shaft (diaphysis) 62.

As the cartilage of the growth-plate 64 grows (always in the direction toward the epiphysis), it is replaced continuously by newly formed bone (always on the side toward the diaphysis). No further longitudinal growth of the bone takes place after the growth of the growth-plate ceases.

Bone formation, also called ossification, is the process by which new bone material is produced. Ossification begins about the third month of fetal life in humans and is completed by late adolescence. Bone growth occurs when a gelatinous substance is secreted in the cartilage. Soon after, inorganic salts are deposited in the gelatin to form the hardened material known as bone. While the bone is growing, the growth-plate 64 is continually growing and being replaced by bone. When the bone is in the growth period, the growth-plate grows at about the same rate as it is turned into bone. Thus the growth-plate remains at a relatively constant thickness until bone growth is completed, at which time the growth-plate disappears, as it ossifies.

Not all bones stop growing at the same age. Bone growth ends and the growth-plate disappears following a chronological order according to the skelatal maturation and growth process. The last bone growth, and thereby the disappearance of the growth-plates, occurs at around age 20. While growing, the growth-plate is said to be "open." When the growth-plate has disappeared (having been replaced by bone at the end of the growth period), it is said to be "closed."

Bone growth from ages 11 to 18 years has a strong relationship to puberty status, and thus gender, since girls generally experience puberty about one years prior to boys. In the United States, puberty starts at the mean age of 11 years for boys and 10 years for girls. International studies in Western countries report similar ages. The end of puberty occurs about 2.5 to 3 years after the first sex characteristics appear. Therefore the end of puberty typically occurs at age 13.5-14 years in boys, and 12.5-13 years in girls.

Bone age has been used as a clinical tool to assess the point at which a child arrives in his or her skeletal development. Towards the end of puberty, the bone growth-plate is ossified into bone and is no longer recognizable using, for example, x-ray imaging.

There are different methods for examining bone by taking x-rays of the wrist and hand and comparing them with pictures and drawings in Atlases and tables. The methods of Gruelich & Pyle (GP) and Tanner & Whitehouse, (TW2) are the most utilized. These methods, as well as other relevant data, are described in, for example, the following publications, the contents of which are incorporated herein by reference:

Pediatric endocrinology; ed. J. Bertrand et al. Williams & Wilkins (Baltimore) 1993;

Radiographic Atlas of Skeletal Development for the hand and wrist. W. W. Gruelich & S. I. Pyle;

Assessment of skeletal maturity and prediction of adult height. J. U. Tanner & R. H. Whitehouse;

Mechanism of the stimulatory effect of GH on longitude bone growth. O. Isaksson et al. Endocrine reviews. 8(4); 426:1987;

Williams Textbook of endocrinology. 9th ed. W.B. Saunders Company, Philadelphia;

Best and Taylor's physiological basis of medical practice. 11th ed. Williams & Wilkins, Baltimore/London;

M. E. Herman-Giddens et al. Secondary sexual characteristics and menses in young girls. Pediatrics 89;505-512, 1997;

F. M. Biro, A. W. Lucky, G. A. Hoster. Pubertal staging in boys. J. Pediatrics 127;40-46,1995;

S. J. Ulijszek, E. Evnas, D. S. Miller. Age of menarche of European, afro-Caribbean and Ino-Pakistani schoolgirls living in London. Ann Human Biology 18;167-75:1991;

M. A. Sperling ed. Pediatric endocrinology, W.B. Saunders Company. Ovary and female sexual maturation disorders of sexual differentiation and puberty;

P. C. Sizonenco. Pediatrics 14;191-120:1987;

A. F. Roche, R. Wellens et al. Timing of sexual maturation in a group of US white youths. J. Pediatric endocrinology and Metabolism 8;11-18:1995;

Elliot, Glenn R. and Feldman, Shirley S. (1995). At the Threshold, The Developing Adolescent. Cambridge, Massachusetts and London, England. Harvard University Press;

Tanner J M: Growth at Adolescence, $2^{nd}$ ed. (1962) Blackwell scientific publications, Oxford;

Greulich W. W. & Pyle S. I. (1959) Radiographic Atlas of Skeletal Development of Hand and Wrist. Stanford University Press, California;

Elgenmark O: The normal development of the ossific centers during infancy and childhood. *Acta Pediatr Scand* 1946; 33 (suppl. 1);

De Roo T et al. (1976) Pocket atlas for skeletal age. Martinas Nijhoff, The Hague, Netherlands;

Annemieke M et al: Bone mineral density in children and adolescents: relation to puberty, calcium intake and physical activity. J Clin Endocrinol Metab1997; 82:57-62;

Kendig's Disorders of the respiratory tract in children. Ed. Chernick. $5^{th}$ edition, 1990, Saunders;

Lucas W P et al J Pediatr 6:533-545, 1935;

Adolescene ($5^{th}$ edition) Laurence Steinberg 1996.

The CIBA collection of Medical Illustrations, volume 4, Endocrine systems and selected metabolic diseases, Frank. H. Netter, M.D. 1970.

From these publications, and irrespective of gender and ethnicity, one can conclude the following:

Almost all children have an "open" epiphyseal plate, as follows:

In the phalanges—an "open" epiphyseal plate is detectable up to the age of 12.5 years for girls; and 14 years for boys. At the age of 14.5 years for girls and 16.5 years for boys, only in about 2.5% of the population an "open" epiphyseal plate detectable in the phalanges.

In the wrist (ulna)—an "open" epiphyseal plate is detectable up to the age of 13 years in girls; and 14.5 years in boys. At the age of 17 years for girls and 18 years for boys, only in about 2.5% of the population is an "open" epiphyseal plate detectable in the ulna.

In the wrist (radius)—an "open" epiphyseal plate is detectable up to the age of 15 years for both girls and boys. At the age of 17 years for both girls and boys, only in about 2.5% of population is an "open" epiphyseal plate detectable in the radius.

Thus, one can assume that in 97.5% of all children, the lowest threshold for the "open" growth-plates is at age 12.5, and the highest threshold for "closed" growth-plates is at age 18. However, in some other existing long bones of the body (like the leg tibia), the epiphyseal growth-plate may still remain "open" (not ossified) until the age of 20 years.

Having such a correlation between the presence of a growth-plate to puberty stage and known chronological age, growth-plate sensing/measurement may be used to provide an indication of the chronological age of an examined individual.

The presently preferred embodiments of the invention use ultrasound techniques to determine growth-plate status, although other techniques, such as optical techniques, can also be used. The are basically two types of ultrasound techniues presently used for examining tissue in medical applications: the ultrasound through-transmission technique; and the ultrasound pulse-echo technique.

In the ultrasound through-transmission technique, a pulse of ultrasound energy is transmitted through the bone from one side to the other side of the bone location where the development of the growth-plates occurs. A set-up such as shown in FIG. 2a may be used. The ultrasound propagation velocity can be measured by measuring the pulse flight time and the distance between the transmitter (26) and the receiver (28). The ratio of the distance to the time of flight (TOF) is the effective sound velocity in the examined tissue. It is an "effective" sound velocity in the sense that it is an average sound velocity through the different types of tissue along the ultrasound path.

The sound velocity in tissues of different types is listed below:

Fat: 1460 -1480 m/s
Blood: 1560-1590 m/s
Muscle: 1500-1600 m/s
Cartilage: 1750 m/s
Trabecular bone: 1700-2000 m/s
Cortical bone: 3000-4200 m/s (age dependent)

Sound velocity measurements can thus be used to clearly distinguish between cortical bone and cartilage because of the large difference in the sound velocity in these two types of tissue. Thus the measurement location should be selected such that the sound waves pass across an area where bone and growth-plate are interfacing.

Figure 7A:
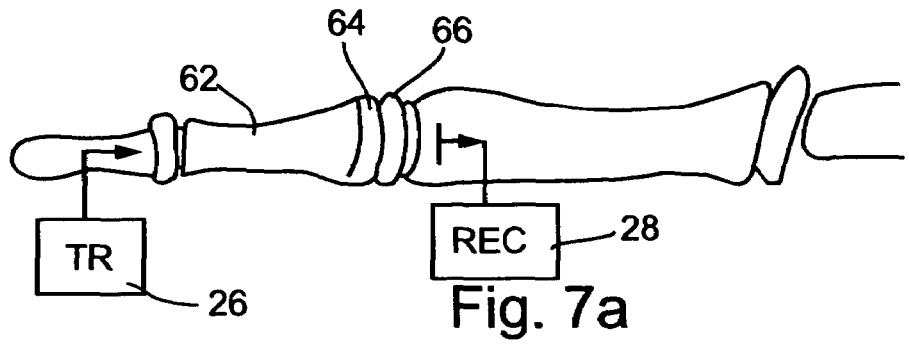
FIGS. 7a, 7b and 7c schematically illustratre three ultrasound scanning techniques that may be used for examining a user's bone to indicate the user's age category in accordance with the present invention.

The through-transmission technique can be applied in two configurations: axial transmission as shown in FIG. 7a and transverse transmission. In the axial transmision configuration (FIG. 7a), the ultrasound pulse propagates axially of the bone. In the transverse transmission configuration (FIG. 7b), the ultrasonic pulse propagates in a perpendicular direction to the long bone axis. The transmission line in this mode should cross the growth-plate region. This method is used in most of the ultrasonic bone strength assessment instruments (osteoporosis diagnostics) and typically measure either the calcaneus (heel) bones or the phalanx (finger or toe) bones.

Figure 7B:
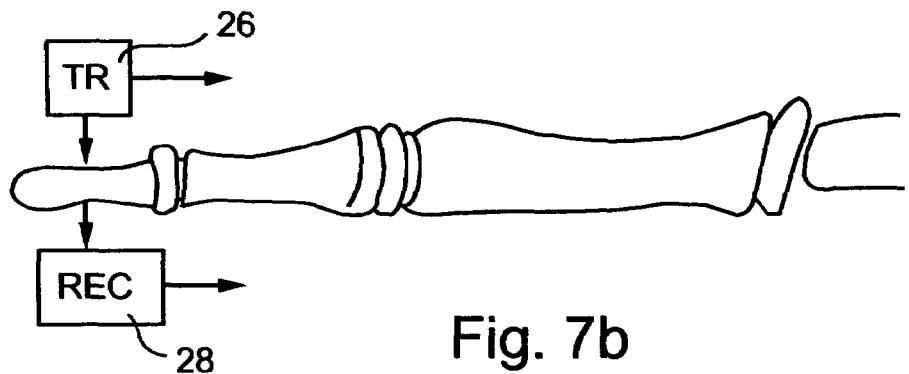

When scanning in the transverse direction as illustrated in FIG. 7b, the part of the finger to be examined is moved between the transmitter and receiver (26, 28, FIG. 2a). In one optional scan condiguration, the part of the finger to be scanned is the joint area of the middle phalange and includes a portion of each of the two bones above and below the joint, (i.e. the end of the proximal phalanx and the beginning of the mid phalanx). These two bone sections are alike in an adult finger; whereas in a child's finger these two bone sections are not similar as the upper bone section above the joint includes a cartilage plate (growth-plate). The method is aimed to detect this lack of similarity between the two sides of a bone joint to distinguish between an adult and a chiled.

In another optional scan configuration, one complete bone (e.g., mid phalanx) is scanned from one joint to the other joint to compare the characteristics of the two ends of the same bone. As in the first scan configuration, the two bone ends are similar in an adult's finger, but not in a child finger. Again the lack of similarity between the two ends of the child's bone is due to the growth-plate that exists in the bone end that is close to the proximal phalanx.

Our ultrasonic method is based on the measurement of the ultrasonic pulse time-of-flight (TOF) at multiple points along a scan line. The ultrasonic TOF (the time for an ultrasound pulse to travel from the transmitter through the tissue to the receiver) is recorded at each scan point.

Figure 8:
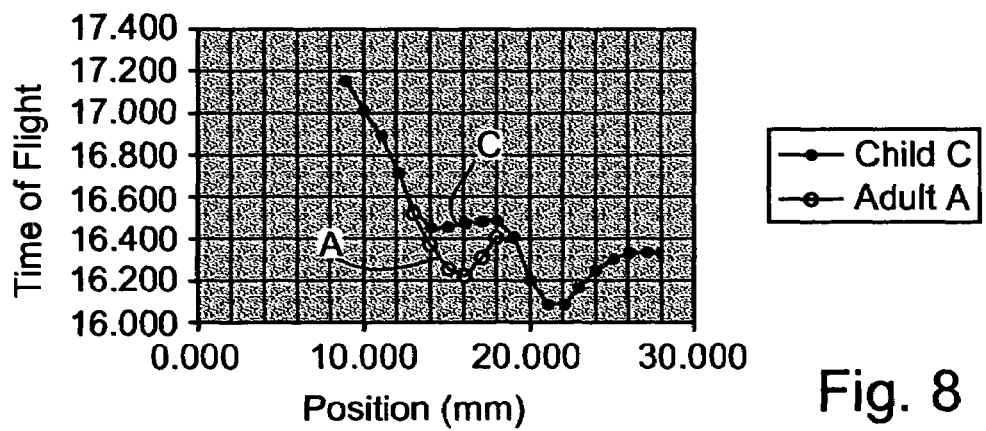
FIG. 8 illustrates results produced when using the scanning technique of FIG. 7b for distinguishing between a child and an adult.

The growth-plate introduces a non-homogeneity in the bone structure. This is manifested, in the measured data of TOF vs. scan position, as a pronounced lack of similarity between the scanned parts that are below and those above the joint. This lack of similarity is shown in FIG. 8. Thus Curve A illustrates the TOF vs. scan position of a finger of an adult, in that the absense of a growth-plate (mature bone) produces two minima, one at each side of the joint. Curve C, on the other hand, illustrates the TOF vs. scan position of a bone of a child, in that the presence of a growth-plate displays only the minimum below the joint; thus, the minimum above the joint disappears because of the delay in the ultrasonic travel since the cartilage nature of the growth-plate tissue produces a much lower speed of sound than in the bone tissue.

Figure 9:
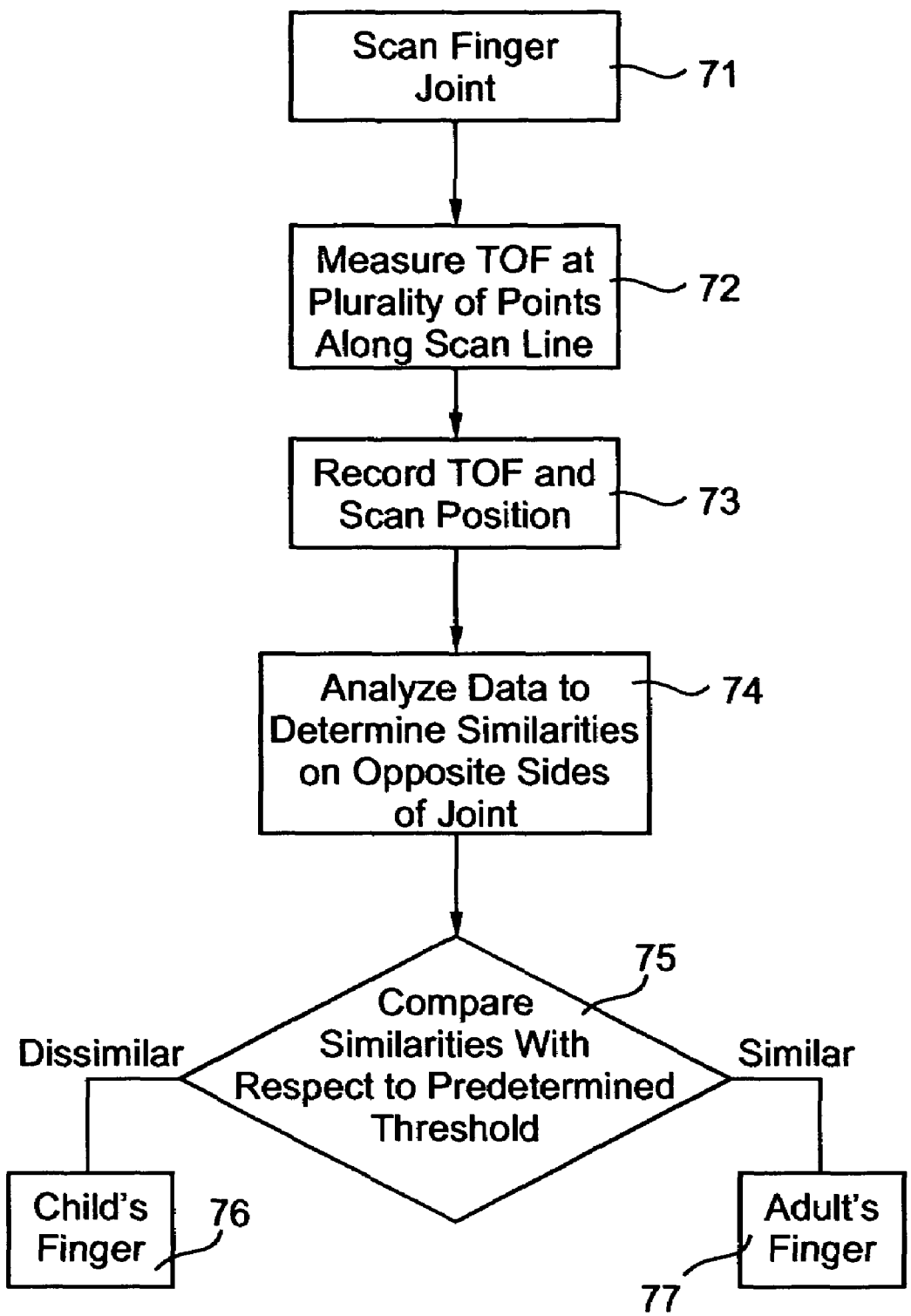
FIG. 9 is a block diagram illustrating a system for implementating the technique of FIG. 7b.

FIG. 9 is a flow chart illustrating an automatic device that identifies the existence of the growth-plate by performing the following tasks:

1. Scanning of the transducer pair along the relevant finger section on opposite sides of the joint (block 71);
2. Measuring the TOF at a plurality of points along the scan line (block 72);
3. Recording the TOF and scan position in a computer (block 73);
4. Analyzing the data by signal processing methods to yield the degree of similarity between the parts below and above the joint (block 74);
5. Compare the similarity level to a predefined threshold level in order to classify the results into one of the two categories/(blocks 75, 76, 77).

Figure 7C:
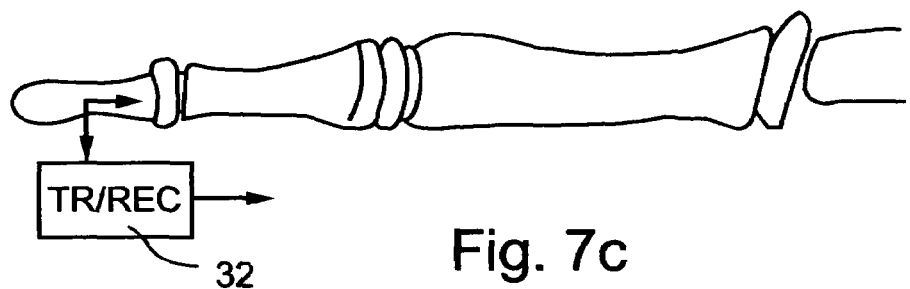

The pulse-echo technique is the underlying technology of medical ultrasonic imaging. An ultrasonic transceiver transmits a pulse of ultrasound, and the same transceiver collects the echoes that are scattered backwards from different types of tissues along the transmission path. This is schematicaly illustrated in FIG. 7c and by transceiver 32 in FIGS. 2b-2e. By scanning the tissue being examined and mapping the intensity of the back-scattering signal, an image of internal organs can be produced. Cartilage tissue (e.g., growth-plate) is characterized by very weak scattering and therefore appears as dark areas in ultrasound imaging. The interface between the cartilage and the soft tissues and the interface between the cartilage and bone reflect ultrasound much better and thus appears as bright lines in ultrasound imaging.

With software to quantify the thickness of the dark area (growth-plate), this technique can be used to determine the thickness of bone growth-plate and to correlate it to age according to a predetermined reference data.

A special type of pulse-echo technique, which utilizes the higher speed of sound in the bones, can be alternatively used. In this technique the ultrasound is propagated along the bone axis and echoes from different structures in the bone, such as the growth-plate, are collected. A typical suitable frequency range for this technique is 0.5 MHz to 2 MHz. The first part of the received signal contains high amplitude reverberations caused by multiple reflections from objects and interfaces in the vicinity of the transducer. The temporal extension of these echoes is designated as "dead zone" since no other reflections can be identified during this initial period. The problem of dead zone is usually overcome by designing delay lines on the transducer face. Any reflection that arrives after the dead zone can be identified in the echo signal if the reflection amplitude is higher than the noise level. The signal-to-noise ratio levels is usually optimized by a proper selection of the bandwidth of the receiving electronic circuits and carefuil shielding techniques. When applying the technique to a long bone that has a distal (or proximal) part, the echo pattern will have a double (long) reflection when there is still cartilage in the growth-plate, and a single (short) reflection when there is no cartilage.

This technique will now be further illustrated by reference to FIGS. 10-13.

FIG. 10 is a schematic presentation of a long bone in an area away from a joint and growth-plate; the bone is schematically indicated at 70 and surrounding soft tissue (muscle, skin, fat, blood, etc.) is schematically indicated at 72 (hereinafter, configuration A).

FIG. 11 is a schematic presentation of a long bone 70 in an area that includes a joint, but has no growth-plate (i.e., an adult bone), the joint being simulated by a 1 mm thick cartilage 74 and 1 mm soft tissue 76 (hereinafter, configuration B).

FIG. 12 is a schematic presentation of a long bone in an area that includes a joint, having a growth-plate (i.e., a child's bone), the joint being simulated by 1 mm thick cartilage 74 and the growth-plate being simulated by a 2 mm thick cartilage 78 (hereinafter, configuration C).

Figure 13:
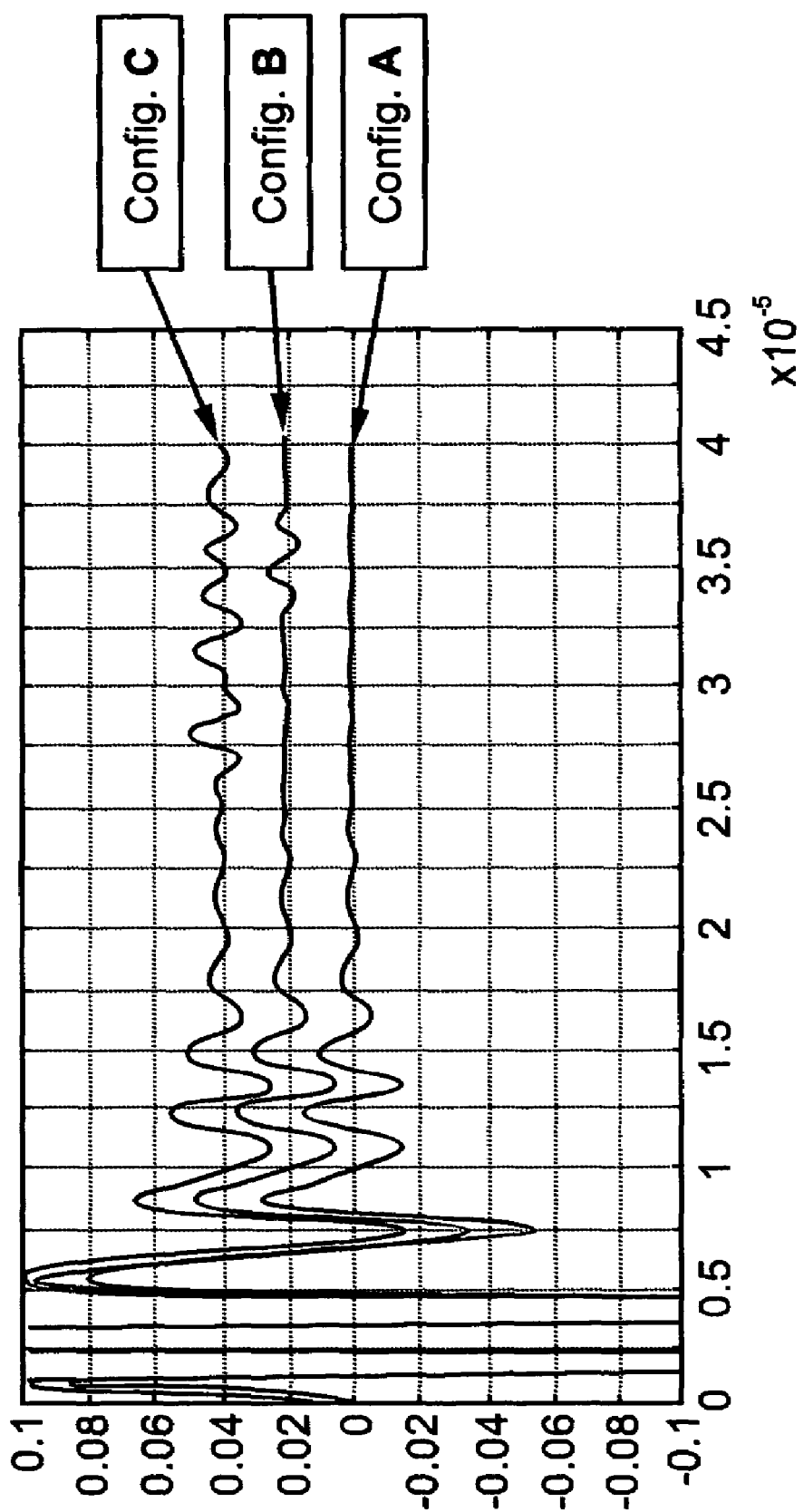
FIG. 13 is a graph illustrating various outputs when using a Pulse-Echo technique in accordance with the present invention.

FIG. 13 shows the outputs of the Ultrasonic Pulse-Echo system using this technique.

Echoes are seen as "blips" in the output curves. A long bone without a joint or growth-plate (configuration A, FIG. 10) has no echoes after the initial "dampening" period.

A long bone with a joint but no growth-plate (adult bone, configuration B, FIG. 11) has, after the initial "dampening" period, only one significant echo at around 32 microseconds.

A long bone with a joint and a growth-plate (child's bone, configuration C, FIG. 12) has, after the initial "dampening" period, several significant echoes, at around 26 microseconds.

The parameters used in the simulation were:

| | Longitude velocity (m/s) | Attenuation at 1 Mhz (dB/cm) | Attenuation Slope (dB/cm/MHz) |
|---|---|---|---|
| Soft tissue | 1580 | 0.05 | 0.1 |
| Bone | 2900 | 2 | 4 |
| Cartilage | 1800 | 0.03 | 0.07 |

Pulse center frequency: 0.5 MHz; Pulse duration: 1 microsecond

According to another embodiment of the present invention, bone mineral density may be used as a biometric feature to determine the age of a user. Thus, in both of the ultrasonic through-transmission methods described herein, a significant part of the pulse trajectory passes through bone tissue. The measured effective velocity is thus influenced by the mechanical properties of the bone.

The variation in the properties of bones during the growth period of children has been studied by Dual Energy X-Ray Absorption (DEXA) techniques and Quantitative Ultrasound (QUS) techniques. For example, see the following publications, the contents of which are incorporated herein by reference.

J. M. Lappe, M. Stegman, K. M. Davies, S. Barber and R. R. Recker; "A prospective study of quantitative ultrasound in children and adolescents"; J. Clin. Densitometry 3(2), 167-175 (2000).

M. H. Lequin, R. R. van Rijn, S. G. F. Robben, W. C. J. Hop and C. van Kuijk; "Normal values for tibial quantitative ultrasonometry in Caucasian children and adolescents (aged 6 to 19 years)"; Calcified Tissue Int. 67, 101-105 (2000).

A. Eliakim, D. Nemet and B. Wolach; "Quantitative ultrasound measurements of bone strength in obese children and adolescents"; J. Pediatr. Endocrinol. Metab. 14(2), 159-164 (February 2001).

Z. Halaba and W. Pluskiewicz; "The assessment of development of bone mass in children by quantitative ultrasound through the proximal phalanxes of the hand"; Ultrasound Med. Biol. 23(9), 1331-1335 (1997).

These studies demonstrate that both the mineral density of bones measured using DEXA, and the mechanical strength, as probed by the QUS techniques, increase during the childhood growth period.

These findings indicate that any bone properties assessment technique (such as DEXA, QUS) can be used independently to establish age group classification.

Figure 14:
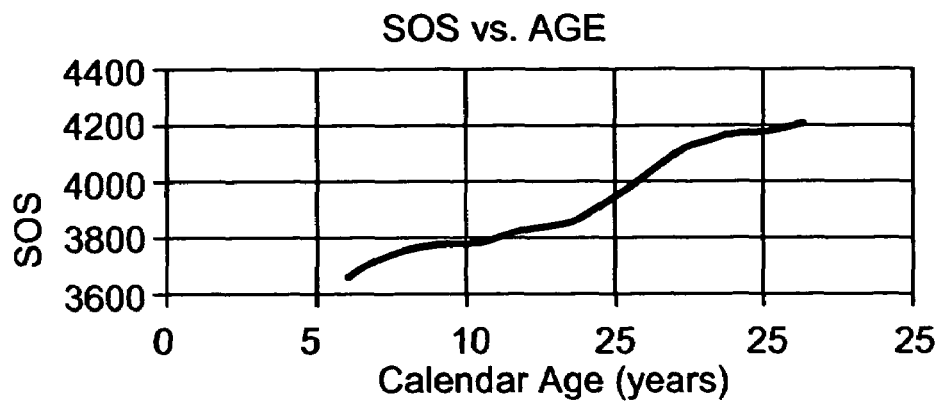
FIG. 14 schematically shows the dependence of the speed of sound in a bone at different ages through childhood to maturity.

FIG. 14 schematically shows the dependence of the speed of sound (SOS) in a bone at different ages throughout the childhood and maturity terms.

The proposed through transmission techniques, in which the pulse travels through both the growth-plate and the bone, combine the two parameters of the bone speed of sound (SOS), and the growth-plate thickness. Since both of these parameters change with age, the resulting effective SOS can be used for the classification of age groups as well as any one of these parameters alone.

It will be appreciated that other growth-plates may be used, e.g., wrist (distal radius bone) and leg (upper part of the tibia); and that other electronic scans may be used, e.g., by a transducer array scan (at the transmitter and or the receiver), instead of a mechanical scan. An asymetry might be caused because of other bone components in the vicinity of the growth-plate and not just by the growth-plate itself. In other words, the bony tissue between the joint and the growth-plate in children might show a different acoustic velocity than the bone portion below the joint. This would contribute to the appearance of assymetry in the TOF scan as well.

It will also be appreciated that other acoustic properties could be measured and recorded instead of the TOF. These may include: acoustic attenuation, peak spectral frequency, width of the first half wave, or others. The same symmetry analysis around the joint could be performed using one of these properties.

It will be further appreciated that additional features of the scan data may be utilized for the classification of the scanned finger as young or adult. Beside the symmetry around the joint position, one may consider also statistical moments analysis, histograms and spectral analysis.

According to a further embodiment of the present invention, optical transmission, rather than ultrasound transmission, may used to detect the presence or absence of a bone growth-plate in an examined bone.

Light propagates through different types of tissues in a different manner. There are two major mechanisms involved in light propagation through tissues: light absorption and light scattering. The absorption mechanism transforms light energy into heat through the interaction of the light radiation with the specific materials that constitute the tissue. The light scattering mechanism involves a process where the light radiation interacts with macroscopic objects like cell membranes, resulting in a change of the momentum of the radiation without energy conversion processes.

Light absorption is described by an absorption coefficient, $m_a$, in the following manner:

The reduction in the intensity of a light due to absorption in a sample of thickness d is equal to $\exp(-m_a d)$. Light scattering is characterized by a scattering coefficient, $m_s$, which describes the reduction of the intensity of the non-scattered light after propagating a distance d in a scattering material. This reduction is equal to $\exp(-m_s d)$. In a simplified model of light propagation through biological tissues the effect of both scattering and absorption can be described approximately as an effective attenuation coefficient, $m_t$, obeying the following equation:

$$\mu_t = \sqrt{3\mu_a(1-g)\mu_s}$$

where g is the average of the cosine of the scattering angles; typically between 0.85 to 0.95 in biological tissues.

Light propagation in soft tissues, like fat and muscles, was studied intensively in the last two decades. Therefore, reliable data concerning soft tissue optical properties is available. Measurement of the optical properties of cartilage is also available due to the interest in optical techniques for cartilage reshaping (e.g., high-power laser ablation techniques). Several studies published in the recent years indicate that the optical effective light attenuation in cortical bone is significantly higher than the optical attenuation in both soft tissue and cartilage. For example, see the following publications, the contents of which are hereby incorporated by reference.

D. W. Ebert, C. Roberts, S. K. Farra, W. M. Johnston, A. S. Litsky and A. L. Bertone; "Articular cartilage optical properties in the spectral range 300-850 nm"; Journal of Biomedical Optics 3(3), 326-333 (July 1998);

A. Takeuchi, R. Araki, S. G. Proskurin, Y. Takahashi, Y. Yamada, J. Ishi, S. Katayama and A. Itabashi; "A new method of bone tissue measurement based upon light scattering"; Journal of Bone and Mineral Research 12(2), 261-266 (1997); and A. Okamoto Ugnel and P. A. Oberg; "The optical properties of the cochlear bone"; Med. Eng. Phys. 19(7), 630-636 (March 1997).

Therefore a measurement of optical transmission through fingers or the wrist can also be used to identify the status of the bone/growth-plate. One implementation of such a device would be the mouse of FIG. 2a wherein transmitter 26 is a light source and receiver 28 is a light sensor positioned in a spaced apart configuration for receiving the user's thumb or finger.

In yet another embodiment of the present invention, skin parameters may be used for age determination. The properties of the skin such as the skin thickness and ultrasonic echogenicity, change during the childhood period. Probing of these parameters can be utilized in the age group classification according to the present invention, as described in the following publication, the contents of which are incorporated herein as reference:. Seidenari et al. [S. Seidenari, G. Giusti, L. Bertoni, C. Magnoni and G. Pellacani; "Thickness and echogenicity of the skin in children as assessed by 20-MHz ultrasound"; Dermatology 201(3), 218-222 (2000)]. This publication studied both the skin thickness and the ultrasonic echogenicity of the skin in children and adults, and revealed age-related variations in both skin thickness and in the ultrasonic echogenicity of the skin.

As indicated above, gender determination may also be used for controlling access in accordance with the present invention. Gender determination may be used for assisting in age determination based on bone growth-plate measurements, as gender related differences in bone growth-plate are known. Gender determination may also be used alone, e.g., for restricting the access of a specific gender to, for example, rest-rooms, Internet sites, etc., for reasons further detailed above.

Figure 15:
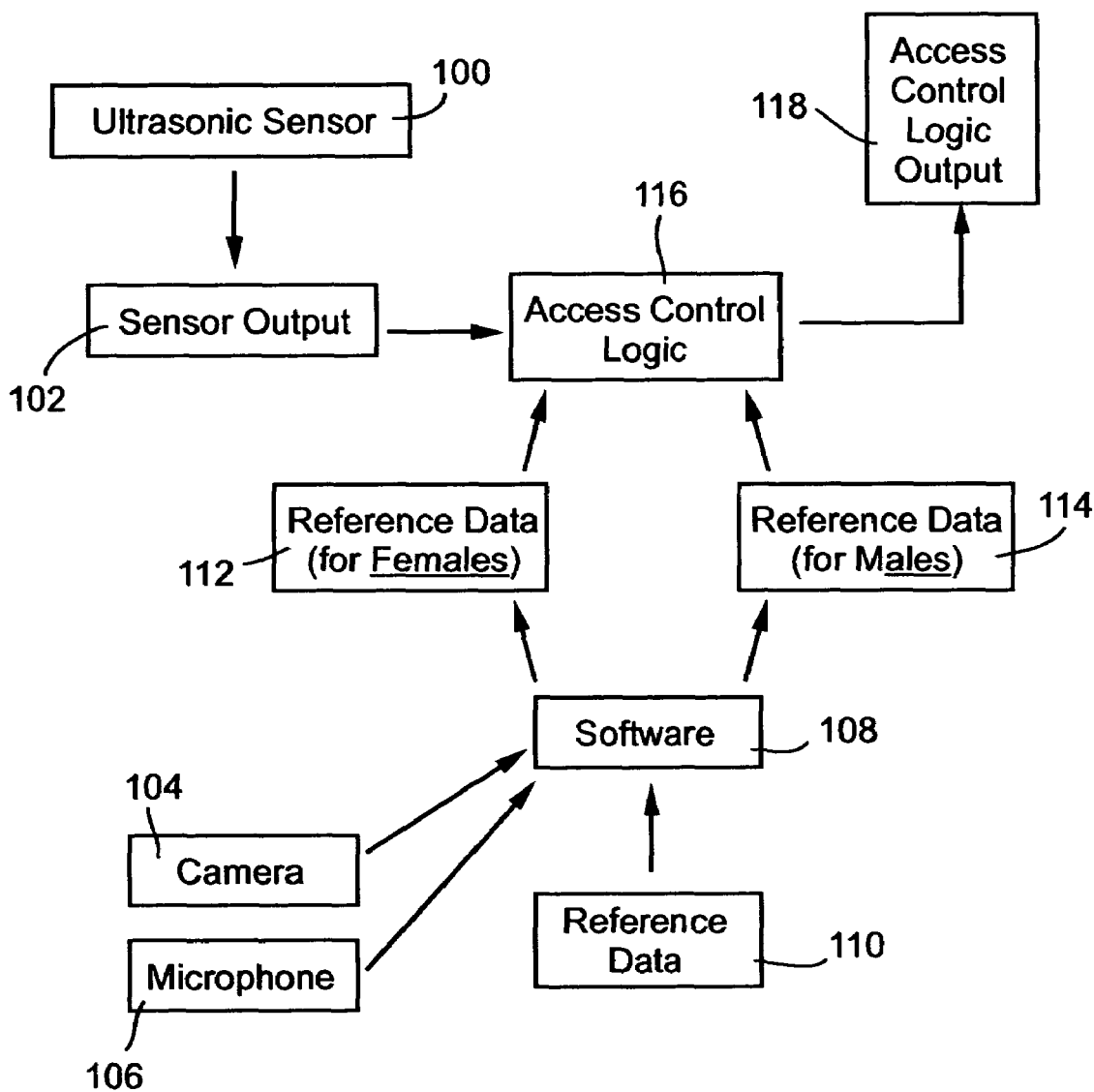
FIG. 15 illustrates a system for sensing both the gender and bone growth-plate of an individual for indicating an age category.
Figure 16:
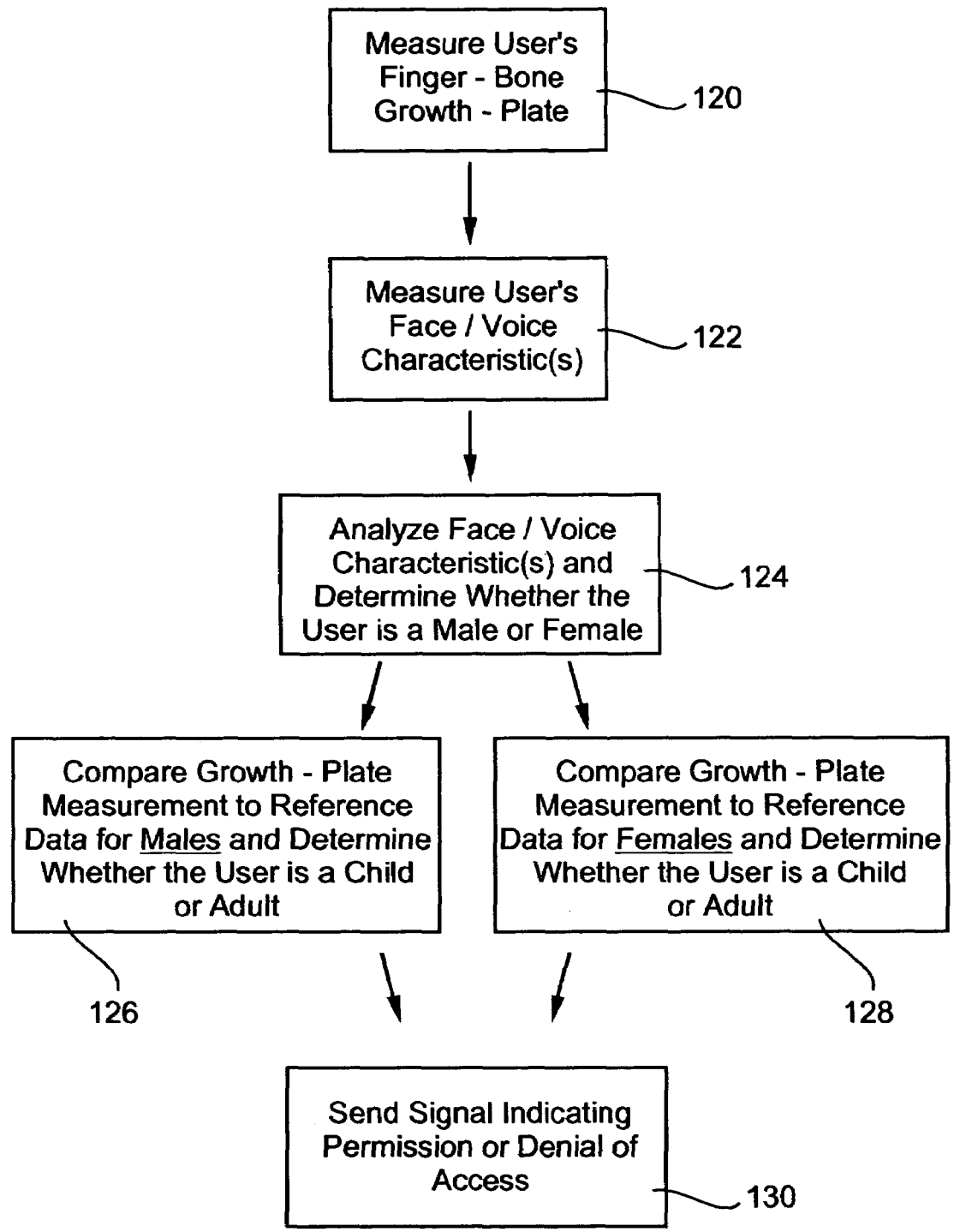
FIG. 16 is a flowchart illustrating a method for automatically controlling access using the individual's gender and bone growth-plate status according to a preferred embodiment of the present invention.

FIGS. 15 and 16 illustrate a further embodiment of the present invention wherein the biometric characteristics of voice and/or of facial features are used with bone growth to determine the sex of the user in order to increase the accuracy in determining whether the user is a child or an adult, since bone growth is somewhat different for boys and girls as indicated earlier.

FIG. 15 is a schematic presentation of the system. It includes, an ultrasonic sensor 100 which generates a sensor output 102, a camera 104 to sense facial features, and/or a microphone 106 to sense voice features of the user. Software 108 recevies the outputs of camera 104 and/or microphone 106 and compares such outputs with reference data 110 which correlates voice and/or facial characteristics to gender. Software 108 uses the outputs of camera 104 and microphone 106, as well as the reference data 110, to determine the gender of the user. This determination of sender causes either the a female/age growth-plate reference data 112, or the male/age growth-plate reference data 114, to be used by access control logic 116 to determine the access status as an output 118.

FIG. 16 is a flowchart illustrating the method that uses both the presence, absence or measure of a bone growth-plate, and the determination of the gender of an individual, to control access.

Thus, as shown in FIG. 16, this method includes the following operations: measuring the user's finger-bone growth-plate (block 120); measuring certain voice and/or facial features characteristics of gender (block 122); analyzing voice and/or facial features to determine whether the user is a male or a female (block 124); comparing the growth-plate measurement with reference data for males (block 126) or for females (block 128), as appropriate; and outputting a signal output indicating permission or denial of access (block 130), according to the results of this comparison.

While the invention has been described with respect to several embodiments, it will be appreciated that these are set forth merely for purposes of example, and that many other variations, modifications, and applications of the invention may be made. For example, while the description has mainly related to the use of the parameter of age to control access to the Internet, there are other parameters that can be used and other locations controlled. For instance, access may be based on the parameter of gender alone, e.g., to control access to a rest-room or a gay site. Access can also be controlled to other locations (e.g., bars, liquor stores, "adult" movie theaters, cigarette vending machines, gambling establishments, amusement rides, etc.), to other electronic media (e.g., TV programs, video, radio, tape compact disk and cassette players), to other computer related locations such as the computer itself or a video/computer game, to the telephone (e.g., chat numbers, shopping lines, adult lines). In addition to sensing the growth-plate in finger bones, other bone related biometric characteristics may be sensed such as wrist, heel, or other bones. Other biometric characteristics may be sensed such as facial development, voice tone or vibration, dental development, skin condition, lung capacity, handwriting, hormones, minerals, chemical composition, hair, saliva, use of language or vocabulary, or body fat, each of which may by itself, and/or in combination with other data be indicative of age and/or gender.

The following references, the contents of which are incorporated herein by reference, teach facial/voice recognition algorithms which can be used for determining the gender of an individual:

C. Adam, F. Eckstein, S. Milz, E. Schulte, C. Becker and R. Putz; "The distribution of cartilage thickness in the knee-joints of old-aged individuals—measurement by A-mode ultrasound"; Clinical Biomechanics 13(1), 1-10 (January 1998).

F. Eckstein, C. Adam, H. Sittek, C. Becker, S. Milz, E. Schulte, M. Reiser and R. Putz; "Non-Invasive determination of cartilage thickness throughout surfaces using magnetic resonance imaging"; Journal of Biomechanics 30(3), 285-289 (1997).

F. Lefebvre, N. Graillat, E. Cherin and G. Berger; "Automatic three-dimensional reconstruction of articular cartilage from high-resolution ultrasound acquisitions"; Ultrasound in Medicine and Biology 24(9), 1369-1381 (1998).

A. M. Aisen, W. J. McCune, A. MacGuire, P. L. Carson, T. M. Silver, S. Zafar Jefri and W. Martel; "Sonographic evaluation of the cartilage of the knee"; Radiology 153, 781-784 (1984).

J. Hodler and D. Resnick; "Current status of imaging of articular cartilage"; Skeletal Radiology 25, 703-709 (1996).

E. A. Ginzel and R. K. Ginzel; "Ultrasonic properties of a new low attenuation dry couplant elastomer"; NDTnet—February 1996 vol. 1, No. 2.

M. E. Zevallos, S. K. Gayen, B. B. Das, M. Alrubaiee and R. R. Alfano; "Picosecond electronic time-gated imaging of bones in tissues"; IEEE Journal of Selected Topics in Quantum Electronics 5(4), 916-922 (July 1999).

V. Perapavat, W. Runge, J. Mans, A. Krause, J. Beuthan and G. Muller; "Development of a finger joint phantom for the optical simulation of early stages of Rheumatoid Arthritis"; Biomed. Technik 42, 319-326 (November 1997).

K. T. Dussik, D. J. Fritch, M. Kyriazidou and R. S. Sear; "Measurements of articular tissue with ultrasound"; Am. J. of Phys. Med. 37, 160-165 (1958).

S. A. Goss, R. L. Johnston and F. Dunn; "Comprehensive compilation of empirical ultrasonic properties of mammalian tissues"; J. Acoust. Soc. Am. 64 (2), 423-457 (1978).

D. Hans, C. Wu, C. F. Njeh, S. Zhao, P. Augat, D. Newitt, T. Link, Y. Lu, S. Majumdar and H. K. Genant; "Ultrasound velocity of trabecular cubes reflects mainly bone density and elasticity"; Calcif. Tissue Int. 64(1), 18-23 (January 1999).

The Facial Recognition Project (FERET) sponsored by the US Defense Department. (www.dodcounterdrug.com/facialrecognition/).

The M2VTS Project: Multi-modal Biometrics Person Authentication. (www.tele.acl.be/PROJECTTS/M2VTS/).

Testing with the YOHO CD-ROM Voice Verification Corpus Project, sponsored by the US Defense Department. (www.biometrics.org/REPORTS/ICAS SP95 .html).

The Center for Spoken Language Research (CSLR) University of Colorado, Boulder. (www.cslr.colorado.edu/welcome.html).

Face Recognition and Gender Determination, Laurenz Wiskott (1995) IWAFGR'95, Zurich (www.cnl.salk.edu/-wiskott/Abstract/Wise Felkrue95.html).

Algorithm of Facial Aging, National Library of Medicine, PubMed Entry No. 10946949.

It will be appreciated that a plurality of biometric sensors, which measure different biometric parameters, can be used for implementing the present invention. These include, for example, magnetic sensors, infrasonic sensors, vibration detecting sensors and biochemical sensors.

Thus, the described method and apparatus controlling access of individuals to a service, device or location in order to restrict access to members of a particular category, are particularly suited to controlling access of children to age-inappropriate Internet sites and offers a plurality of advantages, including the following:

(1) It provides for full automation, with no supervision required;

(2) It precludes circumvention, for example, by the user of forged, stolen, or falsified documents, or a stolen or hacked password;

(3) It provides an objective determination of age verification, avoiding subjective judgment, and circuvention;

(4) It provides an easier, less intrusive, more transparent means for determining age/gender, without a need to remember or input passwords, show age identification, or worry about lost passcards (scanning cards);

(5) It can provide continuing monitoring, and reduces the possibility of one individual successfully posing as another to gain access;

(6) It conveniently permits parents to prevent their children from accessing "age inappropriate" sites/programs, while retaining access for themselves;

(7) It offers flexibility, in that it can require access permission prior to entering a general location or site, or just a particular part of the location or site that may be inappropriate;

(8) It can be used to prevent children from making phone calls to age-inappropriate phone numbers for purchasing goods and services, for placing bets on-line, or for placing credit cards orders without parental permission;

(9) It provides privacy since the user is not specifically known or identifiable;

(10) It is efficient in that it may take less time to grant or deny access than, say, keying in a password;

(11) It can be used to establish parental control of adult surf-free zones in the Internet, which may be of vital importance to the protection of children;

(12) It can be used to allow access to chat rooms to a virtual community (i.e., based on age or gender) where passwords are not practical.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of controlling access of an individual to a service, device or location in order to restrict access to members of a particular age category, comprising:

machine-sensing at least one predetermined biometric characteristic of the individual;

analyzing the biometric characteristic to determine whether the individual belongs to said particular age category; and automatically controlling access of the individual to said particular service, device or location, based on whether the individual belongs to said particular age category, wherein analyzing said machine-sensed biometric characteristic comprises assessing a degree of ossification of an examined bone of the individual to determine a bone age of the individual, wherein said assessing comprises assessing said degree of ossification of the bone by assessing whether a bone growth-plate is present in the examined bone, wherein said examined bone is selected from the group consisting of: a phalanx of a finger, a bone in a wrist, and a bone in a hand of the individual, and wherein said machine-sensing comprises examining a joint of said examined bone to determine whether the growth-plate is present on one side of the joint.

2. The method of claim 1, wherein said machine-sensing comprises examining the phalanx bone to determine whether the growth-plate is present at one end of the bone.

3. The method of claim 1, wherein said machine-sensing comprises examining said bone by transmitting ultrasound through said examined bone.

4. The method of claim 3, wherein said transmitting comprises transmitting said ultrasound transversely through said examined bone.

5. The method of claim 3, wherein said transmitting comprises transmitting said ultrasound axially through said examined bone.

6. The method of claim 1, wherein said machine-sensing the at least one predetermined biometric characteristic comprises machine-sensing at least two biometric characteristics of the individual, one characteristic indicative of the particular age category and the other characteristic indicative of a gender category, and wherein utilizing said at least one machine-sensed characteristic comprises utilizing the at least two machine-sensed characteristics for automatically controlling said access of the individual to said particular service, device or location.

7. The method of claim 6, wherein said machine-sensing comprises machine-sensing facial characteristics of the individual by a camera to indicate the gender category of the individual.

8. The method of claim 6, wherein said machine-sensing comprises machine-sensing voice characteristics of the individual by a microphone to indicate the gender category of the individual.

9. The method of claim 1, wherein said machine-sensing comprises machine-sensing the degree of ossification of the examined bone using an optical sensor to indicate the age category of the individual.

10. The method of claim 1, wherein said automatically controlling the access comprises automatically controlling access to an electronic medium.

11. Apparatus for controlling access of an individual to a service, device or location in order to restrict access to members of a particular age category, comprising:
   at least one sensor, configured to sense at least one predetermined biometric characteristic of said individual indicative of said particular age category; and
   a data processor, configured to receive and analyze the sensed biometric characteristic; determine whether the individual belongs to the particular age category by comparing the biometric characteristic to reference data that correlates the biometric characteristic to the particular age category; and output a signal indicating whether or not access to said particular service, device or location is permitted, based on whether the individual belongs to the particular age category,
   wherein said predetermined biometric characteristic sensed by said sensor includes a degree of ossification of an examined bone of the individual,
   wherein said sensor is configured to sense the degree of ossification of the examined bone by sensing whether a bone growth-plate in present in the examined bone,
   wherein said bone is selected from the group consisting of: a phalanx of a finger, a bone in a wrist, or a bone in a hand of the individual, and
   wherein said sensor is configured to examine a joint in said examined bone to determine whether the growth-plate is present on one side of the joint.

12. The apparatus of claim 11, wherein said sensor is configured to examine the bone in said phalanx to determine whether a growth-plate is present at one end of the bone.

13. The apparatus of claim 11, wherein said sensor comprises an ultrasound sensor.

14. The apparatus of claim 13, wherein said ultrasound sensor is oriented to transmit ultrasound transversely through said examined bone.

15. The apparatus of claim 13, wherein said ultrasound sensor is oriented to transmit ultrasound axially through said examined bone.

16. The apparatus of claim 11, wherein the at least one sensor comprises at least two sensors for sensing at least two respective biometric characteristics of the individual, one of which sensors is configured to sense at least one of the biometric characteristics indicative of the particular age category, and the other of which sensors is configured to sense at least one of the biometric characteristics indicative of a gender category; and wherein said data processor receives and analyzes the at least two examined biometric characteristics, and outputs the signal indicating whether or not access to said particular service, device or location is permitted, based on whether the individual belongs to the particular age category and whether the individual belongs to the gender category.

17. The apparatus of claim 16, wherein said other sensor comprises a camera for sensing a face of the individual.

18. The apparatus of claim 16, wherein said other sensor comprises a microphone for sensing a voice of the individual.

19. The apparatus of claim 11, further comprising a manual control member configured to be coupled to an electronic medium, and wherein said at least one sensor is included in the manual control member.

20. The apparatus of claim 16, wherein said sensors are included in an electronic medium.

21. A memory device storing in an installable format a software application, the application including instructions, which, when read by a data processor, cause the data processor to analyze at least one machine-sensed predetermined biometric characteristic of an individual to determine whether said individual belongs to a particular age category, and to automatically control access of the individual to a service, device or location, based on whether the individual belongs to said particular age category, wherein said predetermined biometric characteristic includes a degree of ossification of an examined bone of the individual, wherein the instructions cause the data processor to sense the degree of ossification by sensing whether a bone growth-plate is present in the examined bone, wherein said bone is selected from the group consisting of: a phalanx of a finger, a bone in a wrist or a bone in a hand of the individual, and wherein the instructions cause the data processor to examine a joint of said examined bane to determine whether the growth-plate is present on one side of the joint.

* * * * *